United States Patent [19]

Vollert et al.

[11] Patent Number: 5,340,009

[45] Date of Patent: Aug. 23, 1994

[54] PACKING

[75] Inventors: Alfred Vollert, La Chaux-de-Fonds, Switzerland; Roger Ecoffet, Villers-le-Lac, France

[73] Assignee: Werthanor S.A., Le Locle, Switzerland

[21] Appl. No.: 943,872

[22] Filed: Sep. 11, 1992

[30] Foreign Application Priority Data

Oct. 4, 1991 [CH] Switzerland ............... 02 934/91

[51] Int. Cl.⁵ .................................................. F16J 15/32
[52] U.S. Cl. ................................. 277/206 A; 277/208
[58] Field of Search .......... 277/206 A, 207 R, 207 A, 277/208, 209, 210

[56] References Cited

U.S. PATENT DOCUMENTS

| | | | |
|---|---|---|---|
| 1,814,678 | 7/1931 | Ferguson | 277/207 A |
| 2,954,264 | 9/1960 | Tisch et al. | 277/206 A |
| 3,325,174 | 6/1967 | Weaver | 277/209 |
| 3,540,747 | 11/1970 | Stjernstrom | 277/208 |
| 4,448,429 | 5/1984 | Thomas | 277/209 |
| 4,750,847 | 6/1988 | Boyd | 277/206 A |

FOREIGN PATENT DOCUMENTS

| | | |
|---|---|---|
| 849948 | 2/1939 | France . |
| 1185726 | 11/1957 | France . |
| 432388 | 5/1963 | Switzerland . |
| 549236 | 5/1974 | Switzerland . |
| 654509 | 12/1948 | United Kingdom . |

*Primary Examiner*—William A. Cuchlinski, Jr.
*Assistant Examiner*—Daniel G. DePumpo
*Attorney, Agent, or Firm*—Griffin Butler Whisenhunt & Kurtossy

[57] ABSTRACT

An annular packing (30) has a cross-section in the form of a dumbbell including two enlargements (31, 32) connected by a neck (33). In a preferred embodiment the enlargements exhibit a polygonal cross-section. The packing advantageously replaces an O-ring seal in which the interior diameter of the ring is large relative to the diameter of the cross-section of the ring. The packing is arranged between two parts driven at different speeds, in precision mechanisms or in horology.

4 Claims, 3 Drawing Sheets

PACKING

The present invention relates to a packing.

Packings are widely employed in mechanisms when it is a matter of sealing off an apparatus from dust or water for example. In precision mechanisms or micromechanisms, such packings are currently called O-ring seals or indeed toroidal seals in view of their annular form and their generally round cross-section.

BACKGROUND OF THE INVENTION

An example drawn from horology will make readily understandable to what end the object of the present invention may be employed, such object being readily usable in many other known domains as for instance that of photography (zoom lenses) or equipment in general.

In its first embodiment the invention described in patent document CH-A-432 388 has as object a watch case comprising two elements which may be oriented in any desired manner relative to one another, one comprising a first annular element bearing a glass and the other a second annular element on which the first is rotatively mounted, a packing being inserted between these two elements.

FIG. 1 of the present invention shows such prior art, somewhat modified relative to the cited document, but however remaining equivalent as far as concerns the form and arrangement of the packing.

The cross-section of FIG. 1 shows that the watch case includes a caseband 8, a back cover 13, a movement 7 housed in the case and a dial 6 surmounting movement 7. An assembly 3 including a bezel 1 exhibiting an annular interior shoulder 20, a crystal 2 fitted to the bezel by means of a first packing 4 and an annular element forming a flange 5, may be driven in rotation relative to the caseband and to the dial.

Between the bezel and the caseband is squeezed a second round packing 9 which assures sealing of the case. Packing 9 is arranged between two coaxial cylindrical surfaces, one 22 of which bounds a portion of the bezel and the other 23 a portion of the caseband. A casing ring 10-11 arranged within caseband 8 presents an annular collar 21 resting on the shoulder 20 of the bezel I so as to engage or retain the rotatable assembly 3 on caseband 8. The caseband 8 shows in its lower portion a collar 24 extending towards the center of the case. On this collar 24 bears the casing ring 10-11. Screws 31 vertically positioned and traversing bores 25 provided in collar 24 are screwed into threads 26 provided in the ring in order to fix the ring to the caseband.

As mentioned hereinabove, packing 9 exhibits a round cross-section. From its manufacturing process, it also exhibits two diametrically opposed injection burrs symbolized on the figure by two dashes 14 and 15. In the dimensions used here, experience has shown when the bezel 1 is rotated, packing 9 rolls or twists on itself in an irregular manner so that the burrs 14 and 15 form helices over the entire periphery of the packing, thus creating a track between the outer world and the interior of the case, this route being used by water in order to penetrate the mechanism within the case.

It has been determined that the phenomenon of twisting may disappear if there be adopted for the O-ring a relationship between the interior diameter Di of the ring and the diameter Dt of the cross-section of the thread constituting the ring, which is less than a limit value which may be estimated at 20. Thus, for an O-ring currently employed in micromechanics and which shows a diameter Di comprised between 0.8 and 5 mm and a diameter Dt comprised between 0.4 and 0.5 mm, such relationship is at worst $5/0.4 = 12.5$ and this O-ring will not twist. On the other hand, in the example shown on FIG. 1, O-ring 9 has an interior diameter Di of 38 mm and a cross-section Dt of 0.7 mm hence a relationship $Di/Dt = 38/0.7 = 57.3$ highly unfavourable.

In this latter case, since the diameter Di of 38 mm is imposed by the design, it would be necessary to provide a thread cross-section of at least 1.9 mm to arrive at a relationship of 20 and avoid twisting of the packing. However, such arrangement will have as consequence an increase in the overall diameter of the timepiece.

The toroidal packing 9 shown on FIG. 1 additionally shows a second drawback. Effectively, through the slot referenced 19 on the figure, there may be introduced not only water, but also dust which by its abrasive action may damage the packing. The packing then runs the risk of no longer sealing out water. To provide a solution to this problem, certain designers provide two toroidal packings, one on top of the other, the first retaining dust and the second—which remains intact—retaining water. However, here the solution is both difficult and cumbersome.

The packing ring described in patent document FR-A-1 185 726 exhibits a polygonal cross-section having two regions separated by a depression which may recall a dumbbell configuration. However, the axis of such dumbbell is shown perpendicular to the axis of the ring in a manner such that if this latter is employed to seal a rotating bezel, one would end up with a prohibitive increase in the overall diameter of the timepiece. On the other hand, mounted between the caseband 8 and bezel 1 of FIG. 1, such ring would urge annular collar 21 onto shoulder 20 with a force such that the bezel could no longer be driven in rotation except at the price of a very substantial force not to mention the risk of seizing up.

SUMMARY OF THE INVENTION

Thus, in order to overcome the cited drawbacks, the present invention proposes a packing which, on the one hand, does not twist up and on the other hand, replaces two superposed seals. For this, such packing is characterized through the fact that its cross-section shows the form of dumbbell including two enlargements connected by a neck, the axis of the dumbbell passing through the neck and the two enlargements being parallel to the axis of the annular packing.

The invention will now be explained with the help of the description to follow given by way of example and referring to the drawings which illustrate it.

DESCRIPTION OF THE PREFERRED EMBODIMENTS

Figure 1:
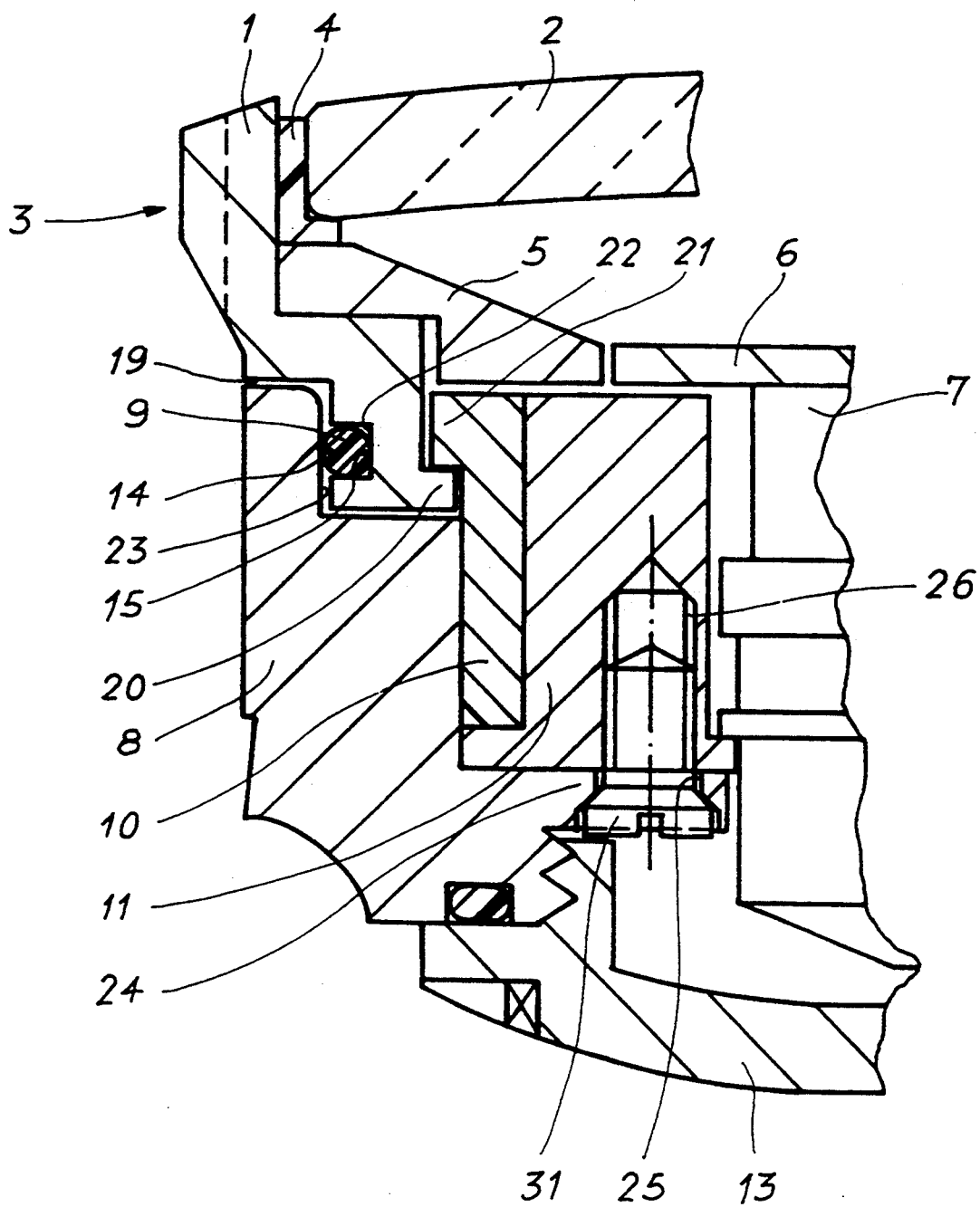
FIG. 1 is a cross-section through a case for a timepiece showing a packing according to the prior art, said figure having been discussed hereinabove.
Figure 2:
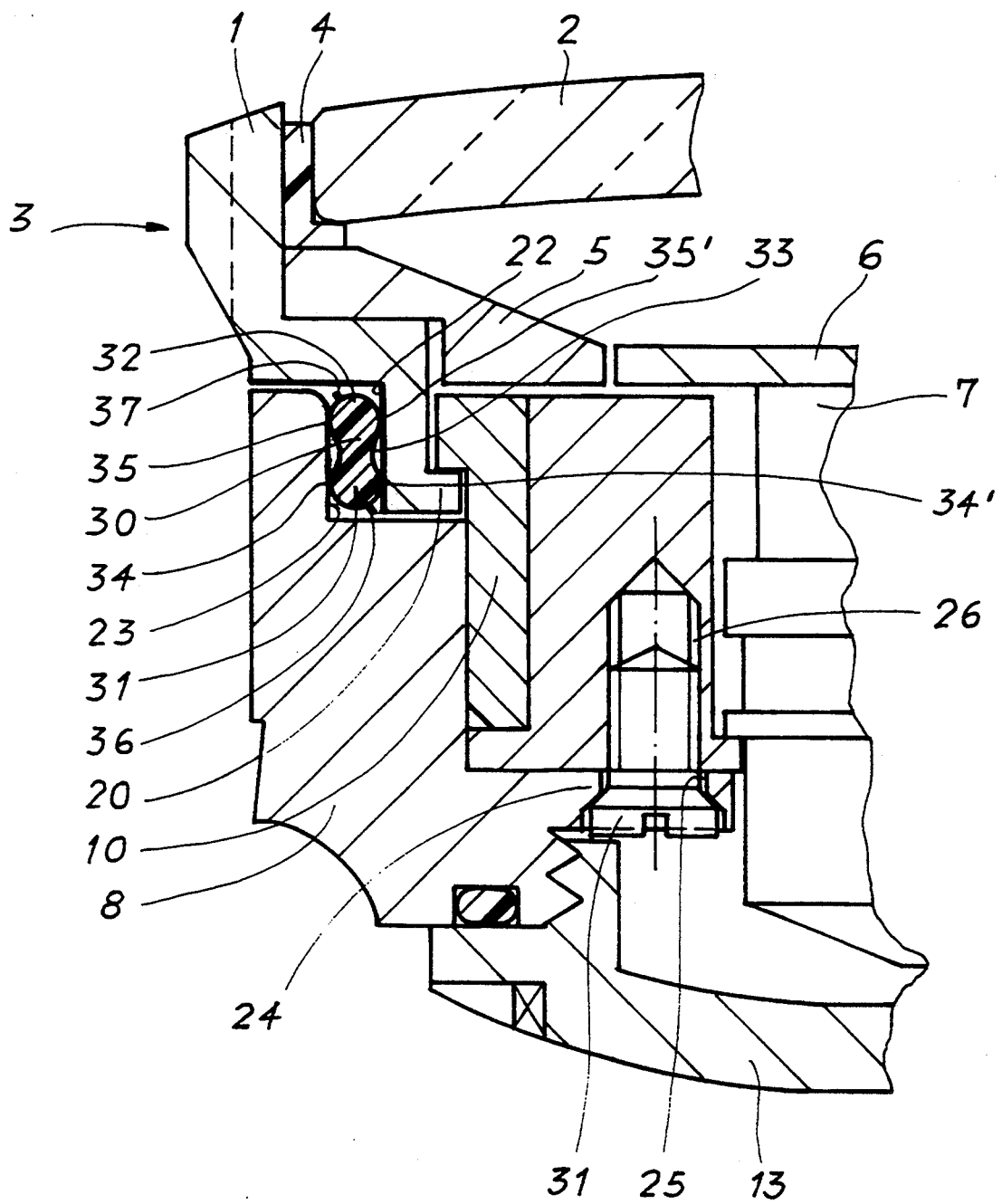
FIG. 2 is a view similar to that of FIG. 1 in which a packing according to a first embodiment of the invention is shown.

FIG. 2 takes up in part what has been shown on FIG. 1, the same parts bearing thus the same references. In place of packing 9 of FIG. 1, on FIG. 2 there will be found a packing 30 the cross-section of which shows the form of a dumbbell defined by two enlargements 31 and 32 connected by a neck 33. Herein is concerned a definition according to the most general meaning of the invention.

More specifically and according to a first embodiment of the invention, FIG. 2 shows that the enlargements exhibit a rounded cross-section recalling to some extent the two O-ring packings brought into question hereinabove. Packing 30 is assembled between two circular elements, bezel 1 and caseband 8 which are fitted into one another, bezel 1 being adapted to be rotatively displaced relative to caseband 8. This assembly defines localized pressure zones on enlargements 31 and 32, such zones here being four in number, namely zones 34 and 34' for enlargement 31 and zones 35 and 35' for enlargement 32. During moulding of packing 30, it is arranged so that the injection burrs 36 and 37 are situated outside the pressure zones in a manner such that such zones are perfectly smooth, the burrs in certain cases being capable of creating a path for water. Thus packing 30 fulfills well the role expected of it, namely the impossibility of twisting and the faculty of retaining dust by the first enlargement 32 and water by the second enlargement 31.

Figure 3:
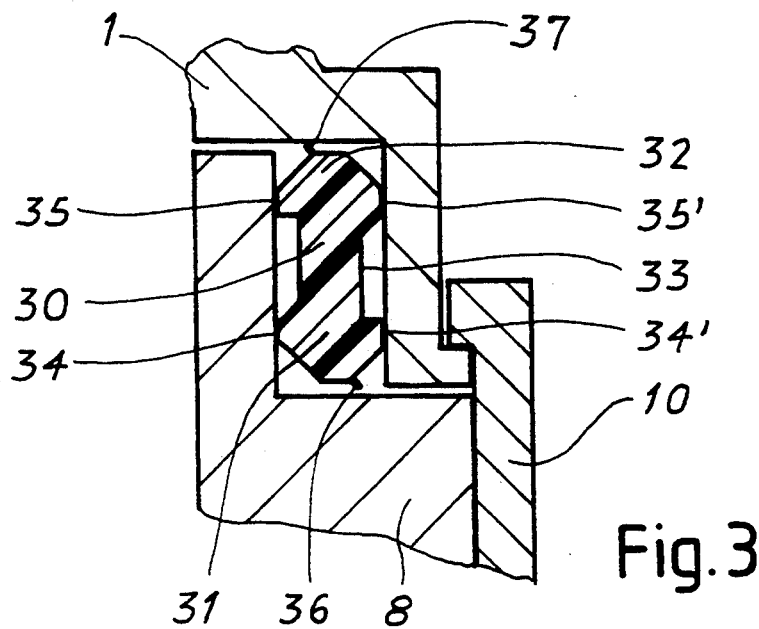
FIG. 3 is a partial view and to an enlarged scale of the cross-section shown on FIG. 2 in which a packing according to a second embodiment of the invention is shown.

FIG. 3 shows a second preferred embodiment of the invention. Here, the enlargements 31 and 32 show a polygonal cross-section. In the same manner as in FIG. 2, such enlargements are connected by a neck 33. Here there are found the same pressure zones 34, 34', 35 and 35'. Here, likewise, during moulding of packing 30, it will be arranged so that injection burrs 36 and 37 are situated outside the pressure zones. The choice of the polygonal form of enlargements 31 and 32 is dictated by the concern of separating as far as possible the pressure zones from the injection burrs. This separation is favoured by a special method of manufacture of the packing as will now be seen.

Figure 4:
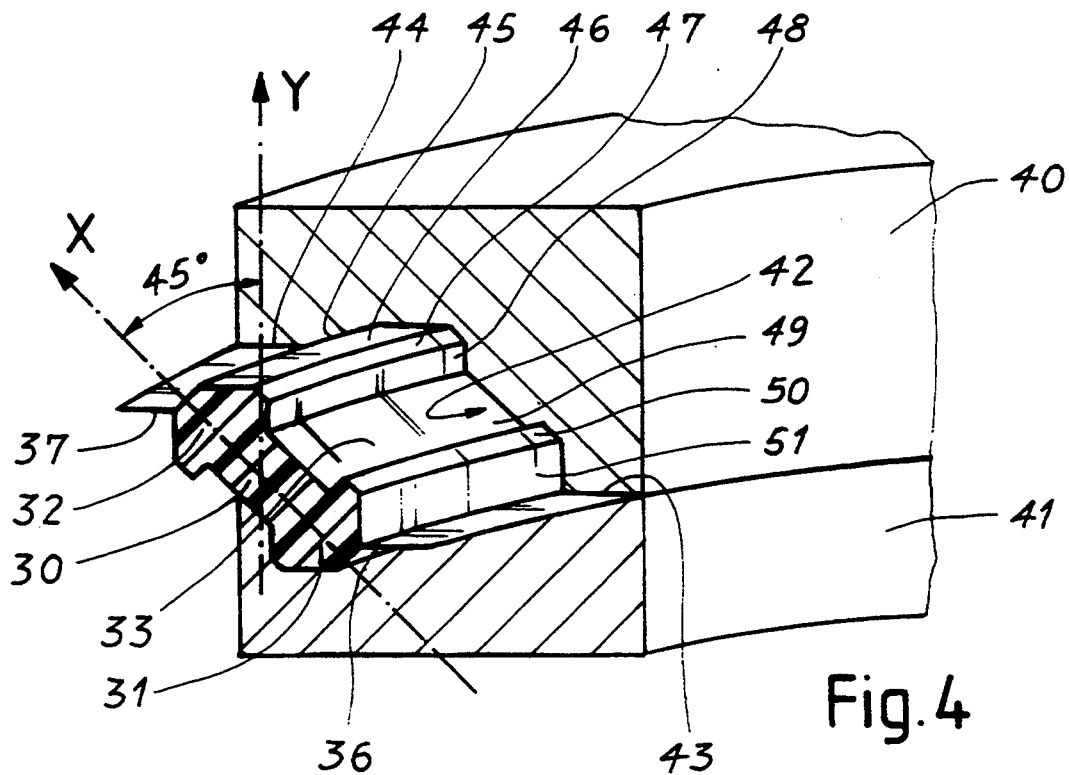
FIG. 4 shows a method of manufacture of the packing shown on FIG. 3.

FIG. 4 enables explaining the method of manufacture of packing 30 shown on FIG. 3. FIG. 4 is a perspective view showing a partially cut-away mould from which emerges the packing which is to be obtained. The mould is formed from an upper portion 40 and a lower portion 41. When such portions are joined, an annular cavity 42 will be formed, the cross-section of which has the form of a dumbbell including two enlargements 31 and 32 exhibiting a polygonal cross-section, such enlargements being connected by a neck 33. It is interesting to note that the axis X of the dumbbell is sloped in the manner of the rim of a dinner plate.

When the two portions 40 and 41 of the mould are assembled, there are formed what are called two parting surfaces 43 and 44 through which injection of elastic material takes place. Once such material has been injected (it generally concerns a polymerizable product) the two portions of the mould are separated and the packing 30 is removed. Finally, the packing is separated from the residue of injection material by cutting off. Such cut off, however, allows subsistence of the injection burrs as mentioned hereinabove and which it is desirable to maintain as far as possible away from the zones in which pressure is exerted on the enlargements when the packing is assembled on the object which it is intended to seal.

In the special case of FIG. 4, the inclination X of the annular cavity 42 relative to the direction Y of separation of the moulds is on the order of 45°. In the same manner, the polygonal cross-section of the enlargements of the cavity show lines 45, 46, 47, 48, 49, 50 and 51 which are oriented so as to permit separation without straining and thus without damaging the elastic material from which the packing is made when lifting of the mould takes place. If such inclination did not exist and if the packing were moulded in the position which it exhibits when it is assembled on the object to be sealed, the material would be torn away during lifting and the joint would be unfit for use. In the same manner, such inclination enables transferring the injection burrs outside the pressure zones.

The fact that the packing is inclined to the exit from the moulding does not in any manner hinder its straight use in the part to be sealed, this coming above all from the fact that there exists a certain natural straightening and that the internal diameter Di is large relative to the cross-section Dt.

It will be mentioned that the moulding technique which has just been described may be applied just as well to the packing with rounded enlargements according to figure 2. There, however, the injection burrs are closer to the pressure zones.

In the example of utilization of the packing according to the invention, hereinabove has been mentioned a timepiece. The invention is not limited to this domain of application, but may be employed whenever one is in the presence of two parts, the speeds of displacement of which are different, such parts being assembled concentrically or telescopically.

What I claim is:

1. An annular packing for preventing leakage of fluid and dust past two annular members having mating cylindrical surfaces separated by a distance, said annular packing defining a central axis and being capable of assuming a free state and an operative state, said operative state being assumed when said packing is in place between said mating surfaces, said packing having a cross-section in a plane containing said central axis, which comprises a neck portion and two enlargements connected together by said neck portion, said cross-section being symmetrical with respect to a straight line which is inclined to said central axis in said free state of said packing and which is substantially parallel to said axis in the operative state of said packing, said neck portion being smaller than said distance and said enlargements being larger than said distance wherein, in said operative state, each of said enlargements defines annular contact faces in contact with both of said mating surfaces and said neck portion is maintained substantially remote from said mating surfaces.

2. A packing as set forth in claim 1 wherein said enlargements exhibit a rounded cross-section.

3. A packing as set forth in claim 1 wherein said enlargements exhibit a polygonal cross-section.

4. A packaging surface as set forth in claim 1 wherein said mating surfaces are adapted to be displaced relative to another.

* * * * *